3,060,212
DICYCLOMATIC MANGANESE COORDINATED WITH TRIDENTATE ETHER
Jerome E. Brown, Detroit, Mich., and Earl G. Dewitt and Hymin Shapiro, Baton Rouge, La., assignors to Ethyl Corporation, New York, N.Y., a corporation of Delaware
No Drawing. Filed July 17, 1959, Ser. No. 827,687
11 Claims. (Cl. 260—429)

This application relates to novel organometallic compounds. More specifically, this application relates to novel organometallic compounds of manganese in which a dicyclomatic manganese compound is coordinated with tridentate ether having the general formula $$R'—O—C_2H_4—O—C_2H_4—O—R'$$

in which R' is a univalent straight chain saturated organic radical having from one to four carbon atoms. The hydrocarbon group is methyl, ethyl, n-propyl or n-butyl. This application is a continuation-in-part of our co-pending application, Serial No. 673,763, filed on July 24, 1957, and now U.S. Patent 2,910,492.

A principal object of our invention is providing new organometallic compounds. A more specific object is providing new organometallic compounds of manganese. A further object is providing organometallic compounds of manganese in which manganese is coordinated with two cyclomatic moieties and is further coordinated with a tridentate ether having the general formula.

$$R'—O—C_2H_4—O—C_2H_4—O—R'$$

in which R' is a univalent straight chain saturated organic radical having from one to four carbon atoms. The hydrocarbon group is methyl, ethyl, n-propyl and n-butyl. The compounds of our invention may be represented by the formula

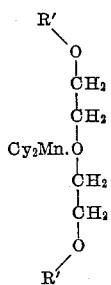

In the above formula, Cy is a cyclomatic radical, that is, a cyclo-pentadiene-type hydrocarbon radical which is a radical containing the cyclopentadienyl moiety in general, such cyclomatic hydrocarbon groups can be represented by the formulae

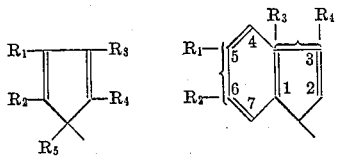

in which the R's are selected from the group consisting of hydrogen and univalent organic hydrocarbon radicals.

A preferred class of cyclomatic radicals suitable in the practice of this invention are those which contain from about five to about 13 carbon atoms. These are exemplified by cyclopentadienyl, indenyl, methylcyclopentadienyl, propylcyclopentadienyl, diethylcyclopentadienyl, phenylcyclopentadienyl, tert-butyl cyclopentadienyl, p-ethylphenyl cyclopentadienyl, 4-tert-butyl indenyl and the like. The compounds which yield these radicals are preferred since they are the more readily available cyclomatic compounds. Preferred compounds of our invention are those in which the cyclomatic radical is methylcyclopentadienyl for several reasons. For example, such compounds are very readily reacted with carbon monoxide to form methylcyclopentadienyl manganese tricarbonyl. This compound is a superb antiknock having great utility as a gasoline additive.

The compounds of our invention are formed by reacting a bis(cyclomatic) manganese compound with an ether having the formula $$R'—O—C_2H_4—O—C_2H_4—O—R'$$

as defined above. This reaction takes place readily at temperatures between about −20° C. to about 180° C. A preferred temperature range is from about 20 to about 160° C. Within the preferred range the reaction goes most readily with the occurence of a minimum of undesirable side reactions. The reaction may be conducted under pressures ranging from about one to about 200 atmospheres. A preferred pressure range is from about one to about 10 atmospheres. The mole ratio of the tridentate ether to the bis(cyclomatic) manganese reactant ranges from about 1:1 to about 200:1. Preferred reactant quantities are those in which from about one to about 20 moles of tridentate ether are employed for each mole of bis(cyclomatic) manganese reactant. Agitation is preferably utilized in the above reaction although this is not essential. The reaction is preferably carried out under an inert blanketing gas such as nitrogen, krypton, argon and xenon. Nitrogen is a preferred blanketing gas since it is more readily available than other inert gases.

Our novel compounds may be formed by another and slightly different reaction than that set forth above. In this reaction, an alkali metal cyclomatic compound such as cyclopentadienyl sodium, indenyl lithium or methylcyclopentadienyl potassium is reacted with a manganous halide compound such as manganese dichloride, manganese dibromide or manganese diiodide in the presence of an ether having the formula $$R'—O—C_2H_4—O—C_2H_4—O—R'$$

as defined above. In this reaction, the conjoint action of the alkali cyclomatic compound, the manganous halide compound and the tridentate ether results in formation of the bis(cyclomatic) manganese tridentate ether compounds of our invention. In general, the reaction may be carried out between about −20° C. to about 180° C. A preferred temperature range is from about 20° C. to about 160° C. Within the preferred temperature range the reaction goes most readily with a minimum of undesirable side reactions. The reaction may be carried out at pressures from about one to about 200 atmospheres. A preferred pressure range is from about one to about 10 atmospheres.

Agitation is preferably employed in this reaction although this is not essential. The mole ratio of alkali metal-cyclomatic compound to the manganous halide reactant is generally in the order of 2:1. For each mole of bis(cyclomatic) manganese compound formed, there is present from 1.0 to 200 moles of tridentate ether.

Our products may be separted from the reaction mass through conventional means such as crystallization. This is accomplished by cooling the reaction mass until our product precipitates out. In some instances where the reaction mass is not sufficiently fluid to accomplish crystallization, the reaction mass may be further diluted by addition thereto of an additional quantity of the tridentate ether used in the reaction. Following this, the diluted reaction mass may then be cooled to precipitate out the the product. In some instances, there may be solids present in the reaction mass which it is desirable to separate from the crystalline product. This may be accomplished through filtration of the reaction mass prior to cooling it to precipitate our product.

Once a solid precipitate is formed, it may be further purified by recrystallizing it from a foreign solvent which is not a tridentate ether. Typical of such solvents are ethylether, isoctane and petroleum ether.

The mode of preparing our novel compounds is more fully illustrated by the following examples in which all parts and percentages are by weight unless otherwise indicated.

*Example I*

Twenty-three parts of sodium and 250 parts of diethyleneglycol di-n-butyl ether were charged to an evacuated autoclave equipped with inlet and outlet ports, temperature control means, pressure control means and agitation means. The mixture was heated to about 200° C. at which point 100 parts of methylcyclopentadiene dimer were fed into the autoclave over a period of about two hours. During feeding of the methylcyclopentadiene dimer to the autoclave, the autoclave temperature was maintained between about 200 to about 218° C. Sixty-three parts of manganese dichloride is added to the reaction mixture and heating is continued for six hours at 160° C. The reaction mixture is cooled and filtered under nitrogen. The filtered solution is slowly cooled until bis(methylcyclopentadienyl) manganese diethyleneglycol di-n-butylether precipitates. The product is separated from the remaining solution and redissolved in petroleum ether. All the operations are carried out under nitrogen. The petroleum ether solution is cooled, and the resulting precipitate is collected and dried under nitrogen. A good yield of bis(methylcyclopentadienyl)manganese diethyleneglycol di-n-butylether is thereby obtained. Analysis confirms this structure.

*Example II*

Twenty-three parts of sodium and 227 parts of diethyleneglycol diethylether were charged to an evacuated autoclave as described in Example I. The mixture was heated to a temperature ranging between 185 and 190° C. One-hundred thirty-nine parts of methylcyclopentadiene dimer were added gradually to the autoclave over a period of about four hours. During this addition, the autoclave was maintained constant at a temperature between about 185 to about 190° C. The solution was then cooled to room temperature and 69 parts of manganese dichloride were added. The mixture is then heated to about 180° C. for about ten hours. The reaction mixture is discharged under nitrogen into 300 parts of diethyleneglycol diethylether. On cooling the solution, there is precipitated in good yield bis(methylcyclopentadienyl) manganese diethyleneglycol diethylether. Analysis confirms this structure.

*Example III*

One-hundred eighty-three and five tenths parts of methylcyclopentadienyl sodium and 94.5 parts of manganese dichloride were charged to an autoclave as described above along with 200 parts of diethyleneglycol dimethylether. The reaction mixture is heated with agitation for ten hours at 20° C. The mixture is then slowly cooled and discharged under nitrogen into about 200 parts of diethyleneglycol dimethylether. On cooling, a good yield of bis(methylcyclopentadienyl) manganese diethyleneglycol dimethylether is obtained. Analysis confirms this structure.

*Example IV*

A clear red-brown solution containing 4.5 parts of dicyclopentadienyl manganese in 23.5 parts of purified diethyleneglycol dimethylether was filtered gradually into 116 parts of stirred diethylether. The yellow solution was cooled by means of Dry Ice. This produced a voluminous, fine, crystalline-yellow precipitate which was filtered and washed with small portions of petroleum ether. The precipitate was carefully dried to yield 3.2 parts of dicyclopentadienyl manganese diethyleneglycol dimethylether. All of the above described operations were carried out under nitrogen. The yellow crystalline product was air-sensitive, but it could be kept for many days under nitrogen. On analysis, it was found to contain 17.6 percent of manganese (calculated, 17.2). Recrystallization of the product as a colorless solid analyzed for 17.2 percent manganese.

When Example IV is repeated using diethyleneglycol dipropylether in place of diethyleneglycol dimethylether, there is obtained a good yield of dicyclopentadienyl manganese diethyleneglycol dipropylether. Likewise, when the process illustrated by the preceding examples is performed at 200 atmospheres and −20° C. good yields of the product are obtained.

The compounds of our invention have great utility in the formation of cyclomatic manganese tricarbonyl compounds. These compounds are exceptional antiknocks.

The compounds of our invention may be utilized to form cyclomatic manganese tricarbonyl compounds through reaction with carbon monoxide. The temperature at which carbon monoxide reacts with the compounds of this invention varies from 0° C. to about 350° C. with the rate of reaction increasing as the temperature is increased. The temperature employed for the reaction depends on the freezing point of the bis(cyclomatic) manganese tridentate ether or the freezing point of additional solvents employed in the reaction and also upon the pressure. An especially preferred range of temperature for the carbonylation of the bis(cyclomatic) manganese tridentate ether compound is from 20 to about 200° C., as temperatures within this range are easily obtainable and good yields are realized.

Carbon monoxide reacts with the bis(cyclomatic) manganese tridentate ether to form cyclomatic manganese tricarbonyl compounds at pressures below atmospheric to as high as 50,000 p.s.i. and higher. A preferred range of pressures at which the reaction can be conducted is from about 10 to about 10,000 p.s.i.g. No great advantage is gained by using higher pressures, and at pressures below about 10 p.s.i.g., the time required to obtain a given amount of product, is considerably lengthened. An especially preferred range of pressures for the carbonylation of bis(cyclomatic) manganese tridentate ether compounds is from 20 to about 1,000 p.s.i.g. as it is found that this reaction proceeds quite readily and can be conducted in moderate-pressure apparatus.

The compounds of our invention may be separated prior to their reaction with carbon monoxide to form cyclomatic manganese tricarbonyl compounds. In many cases, however, it is preferable to carbonylate the reaction mixture containing the bis(cyclomatic manganese tridentate ether compounds. This may be conveniently accomplished, for example, by introducing carbon monoxide, at high pressure, into the autoclave utilized in forming the bis(cyclomatic) manganese tridentate ether compounds. The latter procedure results in a good yield of cyclomatic manganese tricarbonyl compounds without the necessity of isolating the intermediate, bis(cyclomatic) manganese tridentate ether compounds, of our invention.

Although the time required for carbonylating the bis-(cyclomatic) manganese tridentate ether compound varies with the temperature and pressure employed, the time for reaction generally varies between about one to about 10 hours. Agitation is preferably employed in the carbonylation reaction since it results in intimate contacting of the reactants and an even reaction rate.

The cyclomatic manganese tricarbonyl compounds formed by carbonylating the bis(cyclomatic) manganese tridentate ethers of our invention are superb antiknocks. They can be used at varying concentrations in gasoline to improve its antiknock effectiveness.

To illustrate this, a number of these tests were conducted in a single-cylinder CFR knock test engine to determine the improvement in Research Octane number attributable to the additive. The test method employed was that described in test procedure D–908–51 contained in the 1952 edition of "ASTM Manual of Engine Test Methods." These results were conducted by blending a cyclomatic manganese tricarbonyl compound with a base fuel having an octane number of 77.2. It was found that 1.85 grams of cyclopentadienyl manganese tricarbonyl per gallon increased the octane number of the base fuel to 86.3. Similarly, fuels containing 3.71, 7.42, 11.13 and 16.7 grams of cyclopentadienyl manganese tricarbonyl per gallon were rated respectively at 89.4, 93.2, 96.9 and 98.8 octane numbers. Two and six hundredths grams of methylcyclopentadienyl manganese tricarbonyl per gallon increased the octane number of the fuel to 86.3. Likewise, the addition of 4.13, 8.25, 12.23 and 20.63 grams of methylcyclopentadienyl manganese tricarbonyl per gallon gave respectively ratings of 89.6, 94.6, 97.0 and 99.6 octane numbers.

Having fully described our invention by means of the foregoing description and examples, we desire to be limited only within the scope of our appended claims.

We claim:

1. Compounds having the formula

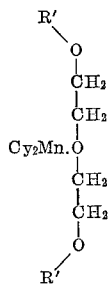

in which Cy is a cyclomatic hydrocrabon radical containing from five to about 13 carbon atoms, said cyclomatic radical containing a cyclopentadienyl ring, and R' is a straight chain saturated hydrocarbon radical containing 1 to 4 carbon atoms.

2. The compounds of claim 1 wherein Cy is the methylcyclopentadienyl radical.
3. The compound of claim 2 wherein R' is the methyl radical.
4. The compounds of claim 1 wherein R' is the ethyl radical.
5. The compounds of claim 1 wherein R' is the propyl radical.
6. The compounds of claim 1 wherein R' is the n-butyl radical.
7. The compound of claim 2 wherein R' is the ethyl radical.
8. The compound of claim 2 wherein R' is the n-butyl radical.
9. The compounds of claim 1 wherein Cy is the cyclopentadienyl radical.
10. Compound having the formula

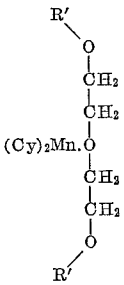

wherein Cy is the cyclopentadienyl ring and R' is the methyl radical.

11. Compound having the formula

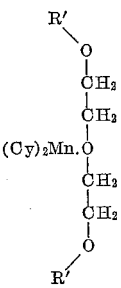

wherein Cy is the cyclopentadienyl ring and R' is the propyl radical.

References Cited in the file of this patent
UNITED STATES PATENTS
2,868,697    Bingeman et al. _____ Jan. 13, 1959